Dec. 22, 1964 H. C. HANSEN 3,162,449

RECORD CHANGING PHONOGRAPHS

Filed May 1, 1962 7 Sheets-Sheet 1

INVENTOR

HANS CHRISTIAN HANSEN

BY Dicke & Craig

ATTORNEYS

INVENTOR
HANS CHRISTIAN HANSEN

BY Dicke + Craig
ATTORNEYS

Dec. 22, 1964 H. C. HANSEN 3,162,449
RECORD CHANGING PHONOGRAPHS
Filed May 1, 1962 7 Sheets-Sheet 3

INVENTOR
HANS CHRISTIAN HANSEN

BY Dicke + Craig
ATTORNEYS

Dec. 22, 1964 H. C. HANSEN 3,162,449

RECORD CHANGING PHONOGRAPHS

Filed May 1, 1962 7 Sheets-Sheet 4

INVENTOR

HANS CHRISTIAN HANSEN

BY Dicke & Craig

ATTORNEYS

INVENTOR
HANS CHRISTIAN HANSEN

BY Dicke + Craig
ATTORNEYS

INVENTOR
HANS CHRISTIAN HANSEN
BY Dicke + Craig
ATTORNEYS

Dec. 22, 1964 H. C. HANSEN 3,162,449

RECORD CHANGING PHONOGRAPHS

Filed May 1, 1962 7 Sheets-Sheet 7

INVENTOR

HANS CHRISTIAN HANSEN

BY Dicke + Craig

ATTORNEYS 3,162,449
Patented Dec. 22, 1964

3,162,449

RECORD CHANGING PHONOGRAPHS

Hans Christian Hansen, 14 Christiansholmsvej, Klampenborg, Denmark

Filed May 1, 1962, Ser. No. 191,600
Claims priority, application Great Britain, May 5, 1961, 16,389/61
22 Claims. (Cl. 274—10)

This is a continuation-in-part application of my application Ser. No. 530,450 filed August 25, 1955, now Patent Number 3,038,727, and relating to record changing phonographs.

More specifically the present invention relates to phonographs having a turntable, electric drive means for driving the turntable including switch means, a relatively stationary record support for supporting a stack of records above the turntable and including means operable to supply the records sequentially to the turntable, a tone arm adapted to carry stylus means, and a cycle control means including a cycle cam and engageable and disengageable cycle cam gear means.

It is a main purpose of the invention to provide a simplified structure of the phonograph of the kind hereabove referred to.

It is a further purpose of the invention to provide a phonograph of the type referred to which has a reduced number of parts.

Still a further purpose of the invention is to provide a phonograph of the type referred to in which the parts are of a design which renders them easy to manufacture and assemble.

Still a further purpose of the invention is to provide a phonograph as hereinbefore mentioned which includes a single manually operable actuator member which can be actuated to switch the electric drive means for the turntable on and off, as well as to engage the cycle cam gear for the purpose of rejecting a record.

Still a further purpose of the invention is to provide a phonograph of the type referred to having a single actuator member mounted for reciprocation in such a manner that reciprocation through a first portion of the reciprocation stroke operates the switch, and reciprocation through a second portion of the stroke operates the cycle cam gear.

Still a further purpose of the invention is to provide a phonograph as hereinbefore mentioned in which the cycle control means can be rendered ineffective in response to the selection of a predetermined drive speed for the turntable.

Still a further purpose of the invention is to provide a phonograph in which the electric drive means can be automatically switched off also in the event that the cycle control means is rendered ineffective at a predetermined drive speed of the turntable.

Figure 1:
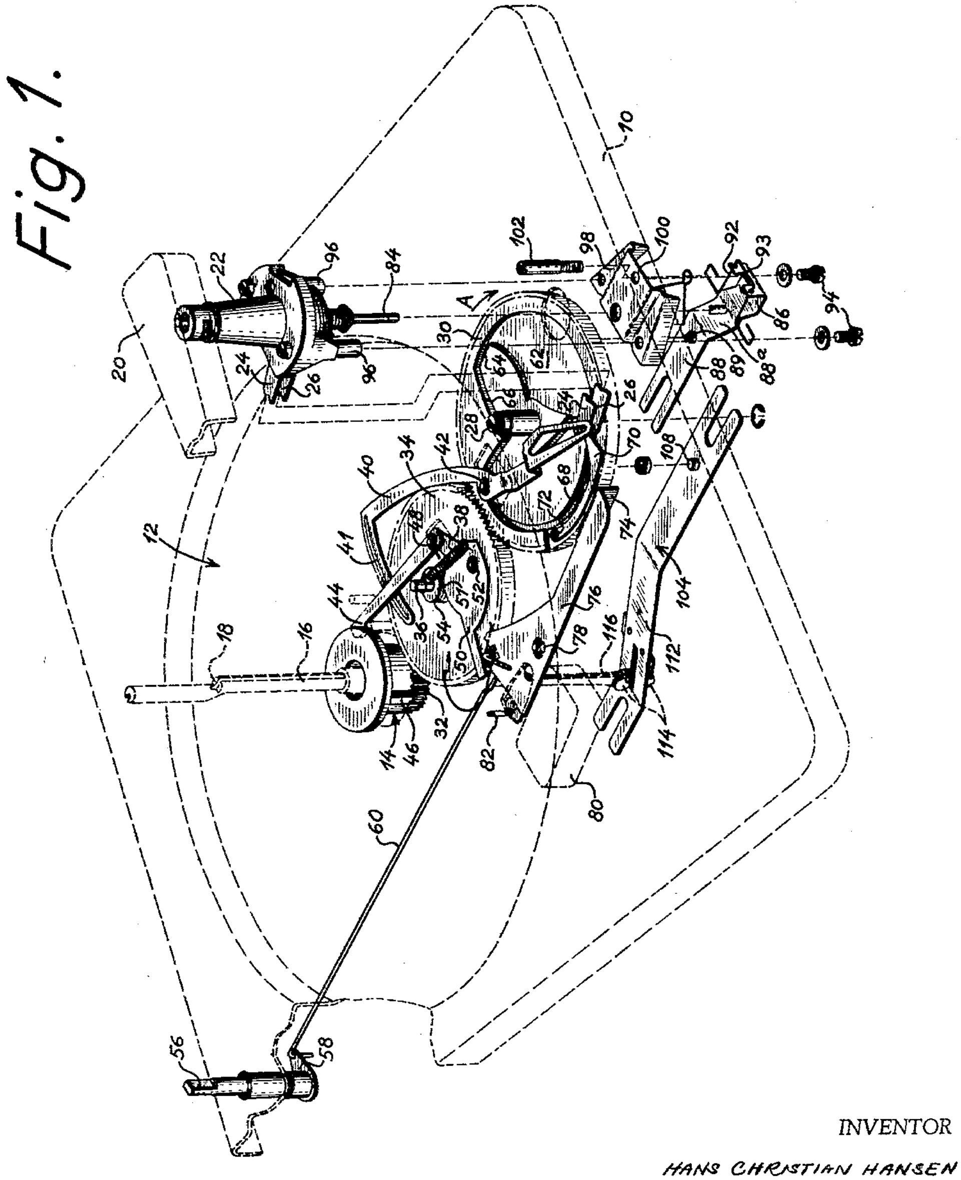
Figure 2:
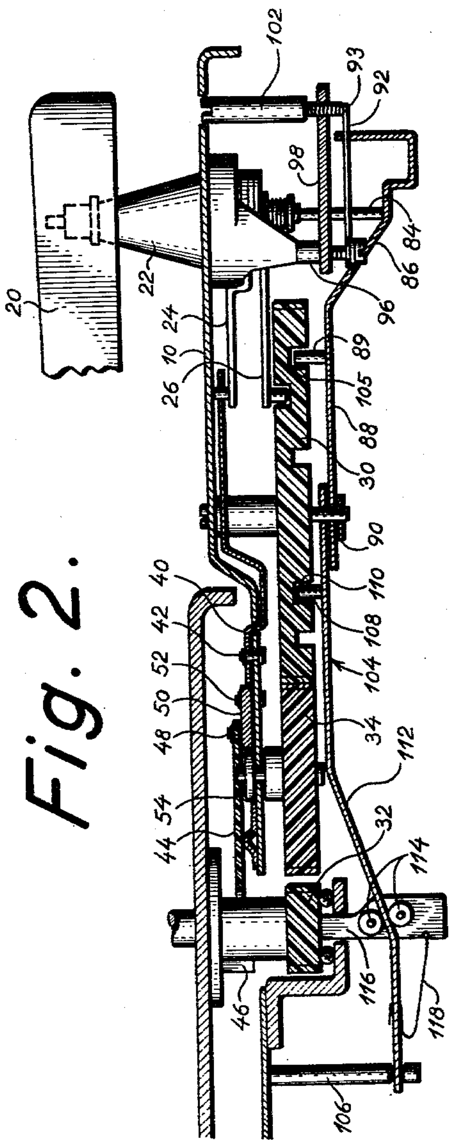
Figure 3:
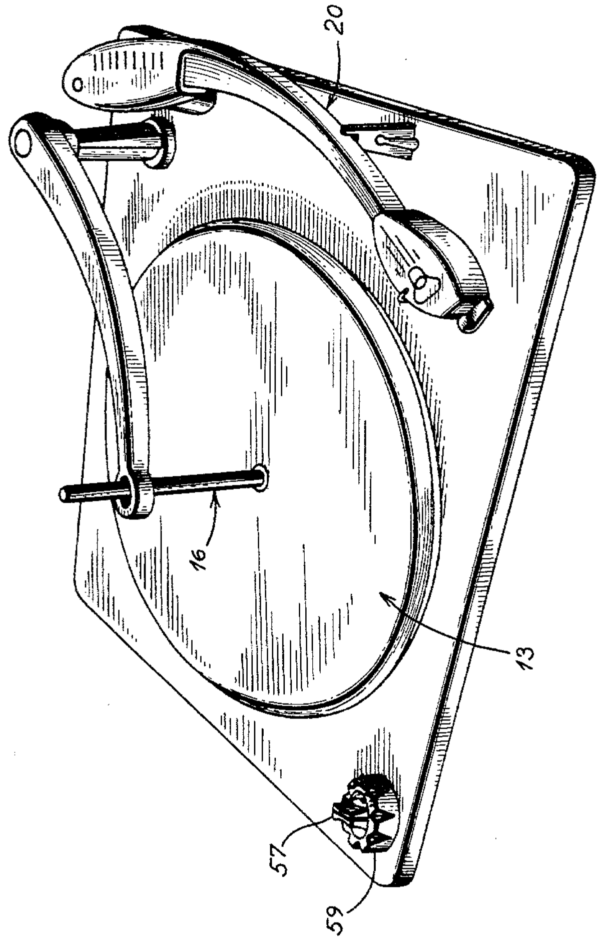
Figure 4:
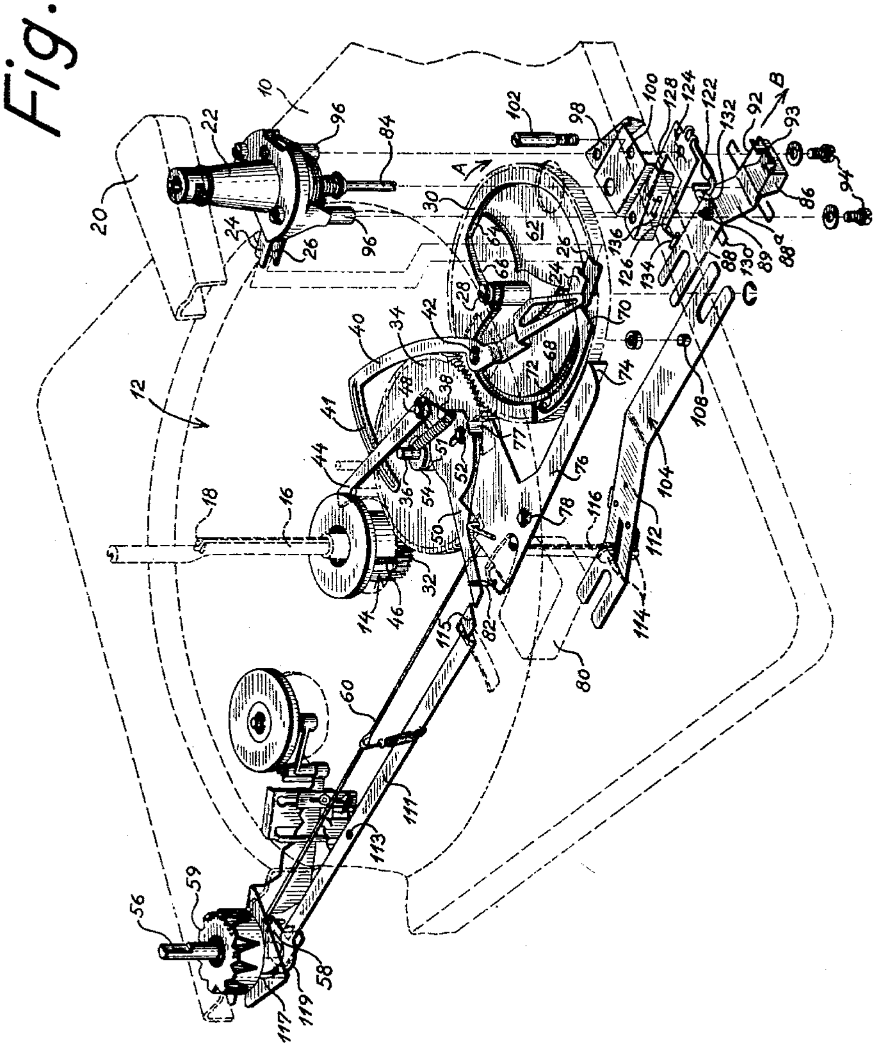
Figure 5:
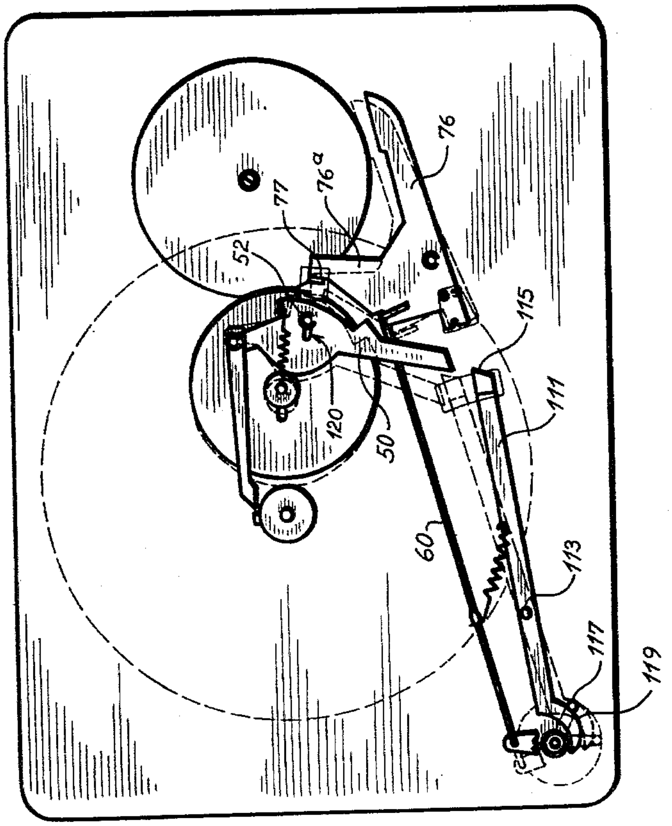
Figure 6:
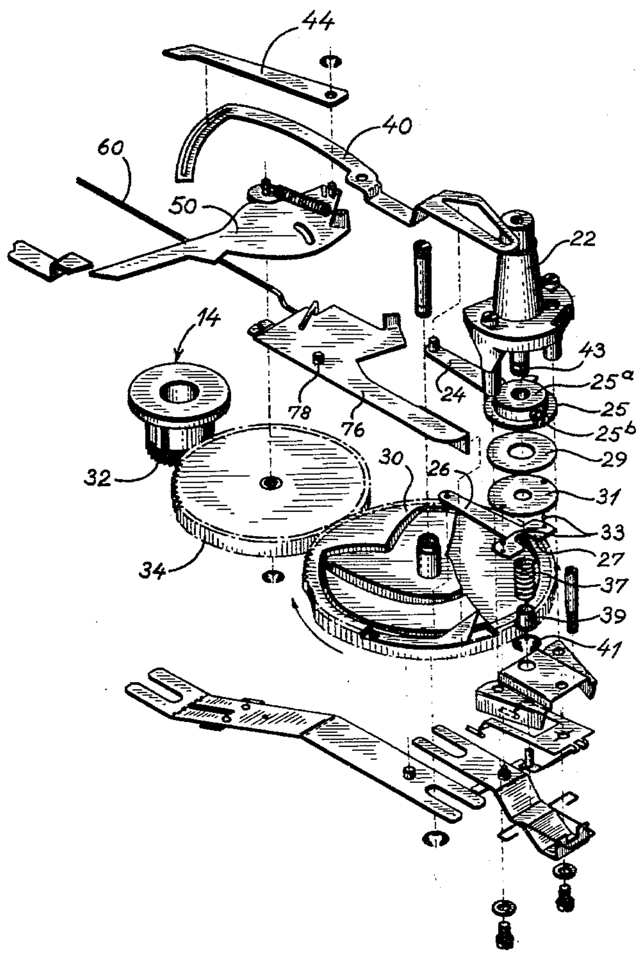
Figure 7:
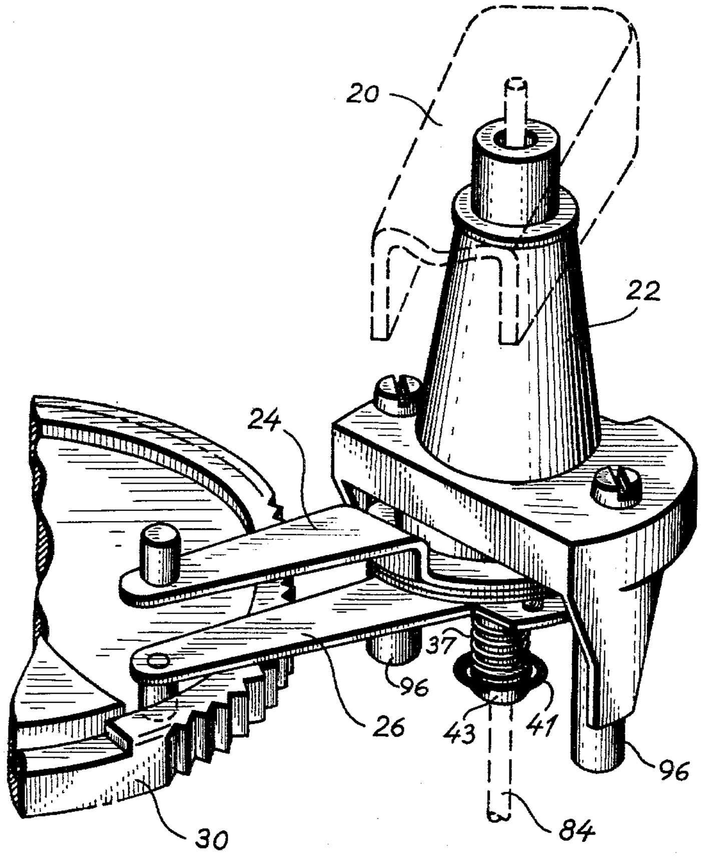

The invention will be further described in the following with reference to the accompanying drawing, in which FIGURE 1 is a perspective, partly exploded view of the essential parts of the control mechanism of the phonograph, FIGURE 2 is a vertical section through the parts shown in FIGURE 1, FIGURE 3 is a general perspective view of a phonograph according to the invention, FIGURE 4 is a perspective, partly exploded view in similarity with FIG. 1, showing a modification of the phonograph, FIGURE 5 is a schematic plane view of the essential parts of the control mechanism of the phonograph shown in FIG. 4, FIGURE 6 is an exploded view showing some of the parts of the phonograph illustrated in FIGURE 4, and FIGURE 7 is a perspective view illustrating the parts shown in FIGURE 6 as assembled.

The phonograph illustrated in FIGURES 1 and 2 comprises a turntable of which only a rotatable centre bushing 14 is shown to facilitate the survey of the other parts of the phonograph. The turntable is driven from an electric motor (not shown) through any suitable gear mechanism at a plurality of selectable speeds, and a switch 80 is included in the motor circuit. A relatively stationary centre spindle 16 is provided adapted to support a stack of records to be supplied sequentially to the turntable. A tone arm structure including a tone arm adapted to carry stylus means and cycle control means is provided for moving the tone arm including a disc like member 30 mounted for rotation and adapted to be driven intermittently from a driving gear wheel 32 associated with the turntable bushing and an idler gear wheel 34 which is movable between an operative position in engagement with the driving gear wheel 32 as well as the cam disc 30 and an inoperative position in engagement with the cam disc only.

A pivotable gear actuator lever 50 is operatively connected with the idler gear wheel 34 to move said idler gear wheel to the operative position in response to being pivoted in an actuating direction. A striker member 44 which is operable in response to the termination of the playing of a record is operatively connected with the gear actuator lever 50 to pivot the same in the actuating direction upon operation of the striker member 44. A pivotable switch actuator lever 76 is operatively connected with the switch member 80 and movable between an inoperative switch-off position and an operative switch-on position. A manually operable control member 60 is mounted for reciprocation and is operatively connected with the switch actuator lever 76 as well as with the gear actuator lever 50 in such a manner that the reciprocable member 60 by movement through one part of its stroke pivots the switch actuator lever 76 from the switch-off position to the switch on position and by reciprocation through a further part of its stroke moves the gear actuator lever 50 in its actuating direction. Eventually a cycle responsive member 70 is associated with the cam disc 30 and operable to move the switch actuator lever 76 to the switch-off position, the structure being so that the member 70 is rendered operable only in response to absence of records on the centre spindle.

More specifically the phonograph comprises as shown in FIGURE 3 a unit plate or chassis plate 10 having a depression 12 for receiving the turntable 13. A stationary hollow spindle is secured in the middle of the depression 12 for rotatably supporting the turntable bushing 14 and receiving the centre spindle. The centre spindle is provided in the embodiment shown with a platform 18 for supporting a stack of records above the turntable to be released to the turntable in sequence.

The tone arm 20 is supported on a stationary post 22 and is mounted for swinging movement as well as for movement in vertical direction. The tone arm assembly includes two arms 24 and 26, of which the arm 24 is firmly connected with the tone arm spindle so as to swing with the tone arm. This arm is an actuator arm for a trigger mechanism. The arm 26 is a cam track follower arm having adjacent its end a cam follower to be guided in tracks in the surface of the cam disc 30 whereby the horizontal swinging movements of the tone arm are controlled. For further details of this structure reference is made to my U.K. Patent No. 859,392 and the corresponding U.S. patent application Ser. No. 688,950. These specifications are hereby made part of the disclosure of this application.

The cam disc 30 is mounted for rotation below the chassis plate 10 on a stationary pin 28 which extends therebelow. The cam disc is driven from the gear wheel 32 which forms an integral part of the turntable bushing 14 by means of the idler wheel 34 which is mounted for rotation as well as for limited movement in radial direction relatively to the turntable centre by means of a pin 36 which extends through an elongated hole or slot in the chassis plate 10. A pair of washers 38 are supported on the pin 36 on each side of the chassis plate 10.

The cam disc has a peripheral recess and the disengagement of the cam disc drive is caused by disengaging the idler gear wheel 34 from the gear wheel 32 by radial movement of the idler gear wheel 34 in a direction away from the turnable centre into the peripheral recess of the cam disc under influence of a spring 38.

The engagement of the idler gear wheel 34 with the gear wheel 32 is caused by the operation of a trigger mechanism which may be constructed according to my U.K. Patent No. 801,176 corresponding to U.S. Patent Application Ser. No. 491,422, if desired in an embodiment of this trigger mechanism as disclosed in my above named U.K. Patent No. 859,392. This trigger mechanism includes a first lever 40 mounted for swinging movement about a stationary pin 42 against a predetermined friction, and the striker 44 which is mounted for swinging movement as well as for reciprocation in response to engagement between its end and a rotating abutment 46 associated with the turntable spindle. The striker 44 engages a surface portion of reduced area of the lever 40 in the form of a rib 41 in the top surface thereof so as to enable the striker 44 to be swung back in clockwise direction in FIGURE 2 by engagement with the rotating abutment 46 as long as the tone arm stylus follows a sound-groove of a record during playing thereof. When after playing of the record the tone arm is moved inwards at faster speed both trip starter levers are swinging faster inwards, whereby the abutment 46 will engage the end of the striker lever 44 and reciprocate this lever.

The lever 44 is pivotable about a pin 48 on the gear actuator lever 50 which is swingingly mounted on the top side of the chassis plate 10 about a pin 52. The reciprocation of the striker lever 44 thereby will cause the lever 50 to pivot about the pin 52 in clockwise direction as seen in FIGURE 1, whereby an arcuate cam edge 51 on the lever 50 will engage the upper of the two washers 54 which are associated with the idler gear wheel spindle 36 so as to move the idler gear wheel 34 radially in the direction towards the turntable centre and thereby cause engagement with the gear wheel 32.

The cam disc 30 may be provided with teeth along its entire periphery also in the peripheral recess which controls the disengaging of the idler gear wheel 34 so as to secure immediate start of the rotation of the cam disc concurrently with engagement between the idler gear wheel 34 and the gear wheel 32.

It is possible, however, within the scope of the invention to provide a resilient bias on the cam disc in its position of rest in the direction of the arrow A. Such bias may be obtained by convenient design of another member of the mechanism which serves another purpose so as to avoid superfluous parts, as will be described in the following.

The start of the cam disc in the manner hereabove described may also be provided for the purpose of rejection of a record by swinging the lever 50 under manual control. To this purpose a control shaft 56 having a control knob (not shown) is mounted for rotation adjacent one corner of the chassis 10. The control shaft has an extending crank lever 58 with which the elongated control member 60 is pivotally connected. The lever 60 is adjacent the other end guided in a slot in the chassis 10 and is bent in the manner shown. When the control shaft 58 is turned counterclockwise it will be understood that the right hand end of the control member 60 engages the front side of the lever 50 as shown in FIGURE 1 and thereby turns this lever to cause engagement between the idler gear wheel 34 and the gear wheel 32 in the same manner as caused by the actuation of the striker lever 44.

The phonograph may be designed to play records of different sizes and include any convenient means for gauging the size of the next record to be played. By way of example the tone arm may be used for gauging the size of the next record according to a feeler scheme subject to my U.K. Patent No. 757,379 and the corresponding U.S. patent application Ser. No. 705,703 including any modifications of the cam disc arrangement as disclosed in my U.K. Patents Nos. 852,061 and 859,371, corresponding my U.S. patent applications Ser. Nos. 602,589 and 633,288, the disclosure of which are hereby made part of the disclosure of this application. The track arrangement which controls the swinging movements of the tone arm will, therefore, only be referred to in very brief terms. In the surface of the cam disc a playing recess 62 is provided which extends to adjacent the periphery of the cam disc and has an outlet in the form of a track 64 which continues into an inwardly leading track 66—the feeler track. A landing track arrangement extends into the playing recess 62, and a stop control track 68 extends parallel with the periphery of the cam disc and merges into the playing recess 62 for controlling automatic start of the phonograph in the manner disclosed and claimed in my U.K. Patent No. 852,061 referred to hereabove. The lever 70 is pivotally arranged about a pin 72 on the top surface of the cam disc and has a portion which extends into the orbit of the stop track so that when the track follower on the track follower arm passes through the stop track 68 the lever or arm 70 will be swung clockwise about the pivot 72 and thereby engage an abutment 74 on the switch actuator lever 76 which is pivotable about a stationary pin 78. The lever 76 has an activating member such as a pin for activating the switch 80. The lever 76 is movable between two exterior positions, a switch-on position and a switch-off position, and is influenced by a snap action spring 82 so that the lever 76 only can assume one of these two positions. As will be understood the switch-on position is the position substantially shown in FIGURE 1, and the switch-off position is a position of the lever 76 swung slightly clockwise relatively to the position shown.

The reciprocable control member 60 is also designed and located to actuate the switch control member 76. More specifically the right hand end of the elongated member 60 engages a notch in the switch control lever 76 in such a manner that by reciprocation of the member 60 in the right hand direction it will cause swinging of the switch control lever 76 to the switch-off position, while by reciprocating the member 60 in the left hand direction, the switch control lever 76 will be swung to the switch-on position. The structure is so designed that when the lever 76 is swung to the switch-on position the end of the member 60 can be disengaged from the switch control lever 76 and by further reciprocation in the left hand direction come into engagement with the gear actuator lever 50 and thereby be moved further through its stroke beyond that part of the stroke which controls the movement of the switch actuator lever 76 from the off-position to the on-position comes into engagement with the left hand end of the gear actuator lever and thereby pivots the gear actuator lever in the same direction as caused by the operation of the striker lever 44, i.e., to cause the engagement of the idler gear wheel 34 with the driving gear wheel 32. In other words, the last part of the stroke of the member 60 is a reject stroke which renders the cycle control mechanism effective.

As will be appreciated the switch 80 can be actuated either automatically from the cam disc in response to the operation of the stop track, or under manual control by actuation of the control knob on the control spindle 56. When from the stop position the control knob is turned continuously in one direction it will first cause the switch control lever 76 to be moved to the switch-on position, whereby the switch will be closed and then actuate the lever 50 to start the cam disc. This means that if the elongated control member 60 is moved through a part of its stroke only it will cause the motor of the phonograph to be started without actuating the change mechanism and thereby enabling the phonograph to be used as a single player in which after playing of a single record the trigger mechanism will be actuated and cause the control mechanism to lift the pick-up from the record and move it to the switch-off position. If it is intended to use the phonograph as a record changing phonograph a stack of records is supported on the centre spindle platform 18 and the control knob moved so as to cause the elongated control member 60 to pass the whole way through its stroke. It will be appreciated that this structure provides a simplicity of the parts.

The raising and lowering of the tone arm is controlled by means of a reciprocable pin 84 mounted within the hollow tone arm spindle into engagement with an inclined cam surface 86 on a reciprocable lever 88. The left hand end of the lever 88 is slotted and guided on the cam disc pin 28 above a spring washer 90 secured adjacent the lower end of said pin. The right hand end of the lever 88 is guided for reciprocation on two branches of a wire spring 92 the shape of which appears most clearly from FIGURE 1. The ends of this wire spring are by means of screws 94 secured on a pair of depending posts 96 rigidly secured to the tone arm bearing structure. A bridge member 98 is also secured on the post 96 so that the bridge member as shown in FIGURE 2 is located slightly above the spring 92. In the bridge member 98 a screw-threaded hole 100 is provided for receiving the lower end of a member 102 operable to adjust the height to which the tone arm is raised. The member 102 has in the top end which extends substantially to the level of the chassis plate 10 and is accessible through a hole therein a notch so as to turn the member by means of a screw-driver. As will be understood from FIGURE 2, the lower end of the member 102 engages the transverse portion 93 of the spring 92, whereby the spring will be bent slightly downwards according to the adjustment of the member 102. Thereby the level in which the right hand end of the lever 88 is guided can be adjusted, i.e., the relative position between the inclined cam portion 86 and the lower end of the tone arm raising control member 84 can be adjusted so as to adjust the height to which the tone arm is raised. The reciprocation of the lever 88 is controlled by means of a track follower 89 which engages a track 104 in the underside of the cam disc.

The operation of the centre spindle mechanism is controlled by means of another reciprocable lever 104 which is slotted at both ends and at the right hand end is guided on the pin 28. The left hand end is guided on a stationary pin 106. The lever 104 has a cam follower 108 guided in a track 110 in the underside of the cam disc. The lever 104 furthermore is provided with an inclined portion 112 which engages between a pair of rollers 114 on the centre spindle actuation member so that when the lever 104 is reciprocated in the left hand direction, the centre spindle actuation member 116 will be moved to control drop of a record from the platform on the centre spindle to the turntable in a well-known manner. It will be understood that this mechanism can be varied within wide limits.

As shown in FIGURE 2 a wire spring 118 is interposed between the lever 104 and the centre spindle control member 116, whereby the lever 104 is subjected to resilient action in the right hand direction. It will be understood that this causes a bias of the track follower 108 against the interior wall of the track 110. Thereby it is possible to transmit this bias as a start bias to the cam disc in peripheral direction by providing the track section of the track 110 in which the track follower 108 is located in the position of rest of the cam disc 30 with an inclination relatively to radius through the centre of the cam disc.

In the embodiment illustrated in FIGURES 3 and 4 a speed selector knob 59 is shown for selecting the speed of the turntable by means of a suitable mechanism which is indicated in FIGURE 4 but which will not be described because such speed selector mechanism for phonographs is well known in the art. The speed selector knob 59 is mounted for rotation concentrically about the control shaft 56 on which a control knob 57 is shown in FIGURE 3.

The embodiment of the phonograph illustrated in FIGURES 4 and 5 includes the same basic elements as those described with reference to FIGURES 1 and 2 and referred to by the same reference numerals in FIGURES 4 and 5.

In addition, however, the embodiment shown in FIGURES 4 and 5 includes means for rendering the change cycle mechanism inoperative in response to the selection of a predetermined drive speed for the turntable. This enables the phonograph to be designed as a record changing phonograph for a plurality of speeds, for example 45 r.p.m. and 33⅓ r.p.m. with a minimum of change cycle time for these speeds and to be used as a single player for 78 r.p.m. Alternatively it also provides for designing the phonograph as a record changing phonograph for 78 r.p.m. and 45 r.p.m. and a single player for 33⅓ r.p.m. by appropriate selection of the change cycle time.

To this purpose a blocking member 111 for the gear actuator lever 50 is provided in the form of a lever pivotally mounted at 113 between an operative position shown in dotted lines with an abutment 115 in position to be engaged by the left hand end of the gear actuator lever 50 and an inoperative position shown in full lines.

The selection of the operative and inoperative positions of the blocking member 111 is made in response to speed selection by means of a pin 117 which extends downwardly from the speed selector knob 59 which engages the cam surface 119 on the lever 111 remote from its abutment 115.

Furthermore, in the embodiment shown in FIGURES 4 and 5 a slot 120 is provided in the gear actuator lever 50 to enable the lever to move relatively to its pivot pin 52 and thereby also enabling the gear actuator lever to swing about the point of engagement between its left hand end and the abutment 115 when the latter is in the operative position.

Furthermore, in the embodiment shown in FIGURES 4 and 5 the switch actuator lever 76 has an extension 76a with an abutment 77 in the form of an upwardly extending flap adapted to be engaged by the rear edge of the gear actuator lever 50 when the latter is swung about its point of engagement with the abutment 114.

Eventually the embodiment shown in FIGURES 4, 6 and 7 differs from the embodiment shown in FIGURES 1 and 2 thereby that the control member or pin 84 for controlling the raising and lowering of the tone arm is supported on the top side of a leaf spring 122 which is mounted to be engaged by an inclined cam surface 88a of the reciprocable lever 88 so as to be bent by such engagement and thereby control the vertical movements of the pin 84. This has the advantage that thereby the lower end of the pin 84 will always be in engagement with a member the inclination of which varies less than the cam surface 88*a* so that minor deviations of tolerances will not cause the pin 84 to be rotated by the operation of the cam 88*a*. Such rotation might be transmitted to the tone arm and cause unintentional swinging of the tone arm.

The leaf spring 122 is a part of a spring structure generally referred to by 124 which in addition to the leaf spring 122 includes a pair of spaced leaf springs 126 and 128 the ends of which are bent downwards to be engaged by each of a pair of opposite flaps or abutments 130 and 132 on each side of the lever 88. The leaf springs 126 and 128 form contact members for engagement with a pair of contact pins 134 and 136 which form a part of a muting switch adapted to short-circuit the pickup cartridge leads during the change cycle.

The mode of operation of the embodiment shown in FIGURES 1 and 2 as well as the embodiment shown in FIGURES 4–7 will be understood from the following description of the mode of operation of the latter embodiment.

It will be assumed that a turntable speed is selected in which the blocking member 111 is in the inoperative position shown in full lines in FIGURE 5, that the switch control lever 76 is in its inoperative or stop position and that the idler gear wheel 34 is disengaged from the driving gear wheel 32. It will further be assumed that a stack of records is placed on the centre spindle.

The phonograph is then started by turning the control knob 57 counter-clockwise. Thereby initially the arm 60 will be reciprocated through a first part of its stroke causing the switch control lever to be swung to its operative position whereby the motor switch is closed and the turntable is started. Due to the snap action spring 82 the switch control lever 76 is moved to its operative position which provides for additional reciprocation of the member 60 with its right hand end movable freely in the slot in the unit plate without engagement with the switch control lever 76. This further stroke and thereby operation of the gear actuator lever 50 is caused by further rotation of the control knob 57 in counter-clockwise direction which will cause the end of the member 60 to engage the gear actuator lever 50 to swing about its pivot 52 and thereby engage its cam portion 51 with the idler gear wheel structure to cause engagement of the idler gear and thereby start the change cycle and rotate the cam disc in the direction of the arrow A. By this rotation initially the track follower on the track follower arm leaves the playing recess 62 and enters the track 64 and thereafter the track 66 which causes the tone arm to be swung inwards.

Prior to this the track in the underside of the cam disc in which the track follower 89 on the lever 88 engages has caused reciprocation of the lever 88 in the direction of the arrow B whereby the inclined surface 88*a* bends the spring 122 upwards and thereby raises the tone arm. Simultaneously the bent ends of the leaf springs 126 and 128 are disengaged from the abutment flaps 130 and 132 whereby the leaf springs are bent downwards by their own tension to engage the contact pins 134 and 136 and thereby close the muting switch and render the electrical system of the pickup cartridge silent during the change cycle.

The track 66 in the topside of the cam disc controls the inward movement of the tone arm to engage an abutment on the tone arm with the next record to be supplied to the turntable so as to thereby gauge the size of the record.

After gauging of the size of the record the tone arm is swung outwards to provide for free drop of the record to the turntable, and the lever 104 is reciprocated and operates by means of its cam surface 112, the actuating member 116 for the centre spindle, to cause the record to be dropped to the turntable whereafter the tone arm is landed in start-of-play position on the record.

During the last part of the movement of the tone arm the lever 188 is reciprocated in the direction opposite the arrow B which causes the lowering of the tone arm and simultaneously engagement of the leaf springs 126 and 128 by the abutments 130 and 132 to move the bent ends of the leaf springs out of engagement with the muting switch contact pins so as to open the muting switch.

At the end of the change cycle the idler gear 34 is disengaged from the driving gear wheel 32.

When after playing of a record the trip starter mechanism 40, 44 operates and the striker lever 44 is reciprocated, the gear actuator lever 50 is pivoted to engage the idler wheel 34 with the driving gear wheel 32 so as to repeat the change cycle.

Eventually when the tone arm is moved idle after playing of the last record without engagement with any further records on the centre spindle, the track follower on the track follower arm 26 enters the exterior track 68 and during its passage through this track it comes into engagement with the member 70 which is swung outwards to engage the abutment 74 of the switch actuator lever to swing the latter and thereby open the switch and start the phonograph.

In the case of the selection of a predetermined speed at which the phonograph can be used only as a single player without actuation of the change cycle mechanism the blocking lever 111 is by means of the engagement of the pin 117 with the cam 119 swung to its operative position shown in dotted lines in FIGURE 5 and the phonograph is started by turning he control knob 57 clockwise as described hereabove.

In such event the reciprocable member 60 cannot, however, be operated to pivot the gear actuator lever 50 because this is prevented by the engagement with the abutment 115.

The record is in this case deposited directly on the turntable and the tone arm is manually deposited on the record with the stylus in engagement with the grooves thereof.

After playing of a single record in this manner the striker 44 is actuated as described hereabove. Since, however, the gear actuator lever is prevented from pivoting about the pivot 52 due to the engagement between its left hand end and the abutment 115, the point of engagement with the abutment 115 provides an auxiliary pivot point and the slot connection 120 enables for pivoting thereabout. Thereby the rear edge of the gear actuator lever 50 engages the flap 77 and pivots the switch actuator lever to its inoperative off-position.

In the foregoing specification the tone arm structure shown in FIGURE 6 has not been described in detail. As shown in FIGURE 6 the track follower arm 26 is in the form of an extension of a washer 27 which is tiltably supported below a washer 31 by means of a pair of spacers, for example, balls which are located diametrically opposite the axis of the tone arm spindle and engage an opposite pair of positioning holes in the washers 27 and 31 respectively. The trip starter actuator arm 24 is also a part of a washer 25 with which a bushing 25*a* is rigidly connected. A positioning screw 25*b* is provided in the bushing 25*a* for securing the washer structure 25, 24 on the tone arm spindle. Between the washers 25 and 31 a friction disc or washer 29 is positioned and the whole structure is assembled by means of a spring 37, a sleeve 39 and a spring washer 31 which engages in an annular recess 43 at the lower end of the tone arm spindle.

It will be understood, however, that the invention is not limited to this embodiment of the tone arm structure which can be varied in different respects within the scope of the invention.

From the foregoing specification it will be understood that the invention provides a simple actuator mechanism for the cycle control mechanism.

The cycle control mechanism itself includes the cam disc 30 and the disengageable idler gear wheel 34 together with the track follower member of the tone arm structure.

A substantial simplification is provided by the present invention thereby that the gear actuator lever 50 as a single member is operatively connected with the trip starter striker lever 44 as well as with the manually operable actuator member 60 and that the switch actuator 76 is operatively connected with the record absence responsive member 70 as well as with the reciprocating lever 60.

In other words the cam gear actuator lever 50 can be alternatively operated to engage the cycle cam gear by the operation of the striker lever 74 upon termination of the playing of a record or by the manual operation of the reciprocable member 60.

In a corresponding manner the switch actuator lever 76 can alternatively be automatically operated by the member 70 when the record supply is exhausted, or it can be manually operated by the reciprocable member 60.

As will be appreciated the whole actuator mechanism is hereby reduced to include the three pars 50, 76 and 60.

In addition the embodiment shown in FIGURES 4 and 5 provides with the same reduced number of parts for bypassing the cycle mechanism to effectuate the switch-off operation.

It will also be obvious from the foregoing specification that in addition to the use of a reduced number of parts in connection with the actuator mechanism, the invention also provides for the use of certain other elements for different purposes during the change cycle.

By way of example, as described hereabove, the spring 118 which acts upon the centre spindle control lever 104 serves the double purpose of retracting the control lever 104 to its inoperative position and simultaneously in the disengaged position of the cycle cam gear to apply a starting torque to the cam disc by engagement of the track follower 108 against a track portion of a track in the underside of the cam disc which forms an acute angle with radius through the point of engagement.

It will be understood that it is possible within the scope of the invention also to provide such starting torque to the cam disc by means of other elements of the structure.

It will also be understood that further modifications will be possible within the scope of the invention.

I claim:

1. In a phonograph having a turntable, electric drive means for driving said turntable including switch means, a relatively stationary record support means for supporting a stack of records above said turntable and including means to supply the records sequentially to said turntable, a tone arm structure including a tone arm adapted to carry stylus means, and a cycle control means including a cycle cam and engageable and disengageable cycle cam gear means, a mechanism comprising in combination: an elongated actuator member mounted for reciprocation through a stroke, manually operable means for reciprocating said actuator member, a single movable switch control member operatively connected with said switch means and having an on-position and an off-position, means operable to control engagement of said cycle cam means, means operatively connecting said actuator member with said switch control member and operable to move said switch control member between the on- and off-position in response to reciprocation of said actuator member through a first stroke portion thereof, means operatively connecting said actuator member with said gear engagement control means operable to engage said gear means in response to reciprocation of said actuator member through a second stroke portion thereof, means operable in response to the termination of the playing of a record, means operatively connecting said record termination responsive means with said gear engagement control means operable to engage said gear means in response to the operation of said record termination responsive means, means operable in response to the absence of a record on said record support means, and means operatively connecting said record absence responsive means with said mechanism and operable to open said switch means in response to the operation of said record absence responsive means.

2. In a phonograph having a turntable, electric drive means for driving said turntable including switch means, a relatively stationary record support means for supporting a stack of records above said turntable and including means to supply the records sequentially to said turntable, a tone arm structure including a tone arm adapted to carry stylus means, and a cycle control means including a cycle cam and engageable and disengageable cycle cam gear means, a mechanism comprising in combination: a single actuator member mounted for reciprocation through a stroke, manually operable means for reciprocating said actuator member, a single movable switch control member operatively connected with said switch means and having an on-position and an off-position, a single movable gear control member operable to control engagement of said cycle cam gear means, means operatively connecting said actuator member with said switch control member and operable to move said switch control member from the off- to the on-position in response to reciprocation of said actuator member through a first stroke portion thereof, means operatively connecting said actuator member with said gear engagement control means operable to engage said gear means in response to reciprocation of said actuator member through a second stroke portion thereof, means operable in response to the termination of the playing of a record, means operatively connecting said record termination responsive means with said gear engagement control means operable to engage said gear means in response to the operation of said record termination responsive means, means operable in response to the absence of a record on said record support means, means operatively connecting said record absence responsive means with said switch control member and operable to open said switch means in response to the operation of said record absence responsive means.

3. In a phonograph having a turntable, electric drive means for driving said turntable including switch means, a relatively stationary record support means for supporting a stack of records above said turntable and including means to supply the records sequentially to said turntable, a tone arm structure including a tone arm adapted to carry stylus means, and a cycle control means including a cycle cam and engageable and disengageable cycle cam gear means, a mechanism comprising in combination: a single elongated actuator member mounted for reciprocation through a stroke, manually operable means for reciprocating said actuator member, a single movable switch control member operatively connected with said switch means and having an on-position and an off-position, means operable to control engagement of said cycle cam gear means, means operatively connecting said actuator member with said switch control member operable to move said switch control member from the off- to the on-position in response to reciprocation of said actuator member through a first stroke portion thereof, means operatively connecting said actuator member with said gear engagement control means operable to engage said gear means in response to reciprocation of said actuator member through a second stroke portion thereof, means operable in response to the termination of the playing of a record, means operatively connecting said record termination responsive means with said gear engagement control means operable to engage said gear means in response to the operation of said record termination responsive means, means operable in response to the absence of a record on said record support means, means operatively connecting said record absence responsive means with said mechanism and operable to open said switch means in response to the operation of said record absence responsive means, turntable drive gear means including speed selector means operable to drive the turntable at a plurality of different speeds, means operable to render said cycle control means ineffective, and means operatively connecting said speed selector means with said cycle control means to effectively render said cycle control means ineffective in response to selection of a predetermined one of said selectable speeds.

4. In a phonograph having a turntable, electric drive means for driving said turntable including switch means, a relatively stationary record support means for supporting a stack of records above said turntable and including means to supply the records sequentially to said turntable, a tone arm structure including a tone arm adapted to carry stylus means, and a cycle control means including a cycle cam and engageable and disengageable cycle cam gear means, a mechanism comprising in combination: a single elongated actuator member mounted for reciprocation through a stroke, manually operable means for reciprocating said actuator member, a single pivotable switch control lever operatively connected with said switch means and having an on-position and an off-poistion, a single pivotable gear control lever operable to control engagement of said cycle cam gear means, means operatively connecting said actuator member with said switch control lever and operable to move said switch control lever between the on- and off-position in response to reciprocation of said actuator member through a first stroke portion thereof, means operatively connecting said actuator member with said gear engagement control lever and operable to engage said gear means in response to reciprocation of said actuator member through a second stroke portion thereof, means operable in response to the termination of the playing of a record, means operatively connecting said record termination responsive means with said gear engagement control means and operable to engage said gear means in response to the operation of said record termination responsive means, means in said cycle control means operable in response to the absence of a record on said record support means, means operatively connecting said record absence responsive means with said switch control lever and operable to open said switch means in response to the operation of said record absence responsive means.

5. In a phonograph having a turntable, electric drive means for driving said turntable including switch means, a relatively stationary record support means for supporting a stack of records above said turntable and including means to supply the records sequentially to said turntable, a tone arm structure including a tone arm adapted to carry stylus means, and a cycle control means including a cycle cam and engageable and disengageable cycle cam gear means, an actuator mechanism for said cycle control means comprising in combination: a single manually operable actuator member mounted for reciprocation through a stroke, a single movable switch control member operatively connected with said switch means and having an on-position and an off-position, a single means operable to control engagement of said cycle cam gear means, means operatively connecting said actuator member with said switch control member as well as with said gear engagement control means and operable to move said switch control member between the on- and off-position in response to reciprocation through a first stroke portion thereof and operable to engage said gear means in response to reciprocation through a second stroke portion thereof, means operable in response to the termination of the playing of a record operatively connected with said gear engagement control means and operable to engage said gear means in response to the operation of said record termination responsive means, and means operable in response to the absence of a record on said record support means operatively connected with said switch control member and operable to open said switch means in response to the operation of said record absence responsive means.

6. In a phonograph having a turntable, electric drive means for driving said turntable including switch means having on and off switch positions, a relatively stationary spindle adapted to support a stack of records to be supplied sequentially to said turntable, a tone arm structure including a tone arm adapted to carry stylus means and rotatably supported disc-like change cycle cam means in combination: gear means operable to drive said cam disc including a driving gear wheel operatively connected with said turntable drive means to be driven therefrom and an idler gear wheel movable between an operative position in engagement with said driving gear wheel as well as with said cam disc and an inoperative position in engagement with said cam disc only, a pivotable gear actuator lever operatively connected with said idler gear wheel to move said idler gear wheel to said operative position in response to pivoting in an actuation direction, a striker means operable in response to the termination of the playing of a record and operatively connected with said gear actuator lever to pivot the same in said actuating direction upon operation of said striker means, a pivotable switch actuator lever operatively connected with said switch means and movable between an inoperative switch-off position and an operative switch-on position, a manually operable control member operatively connected with said switch actuator lever as well as with said gear actuator lever, means for mounting said control member for reciprocation through a first part of a stroke to move said switch actuator lever from said switch-off position to said switch-on position and through a second part of a stroke to move said gear actuator lever in said actuating direction, cycle-responsive means operatively connecting said cam disc with said switch actuator lever to move the same to said switch-off position, and means operable to render said cycle-responsive means operable only in response to absence of records on said relatively stationary spindle.

7. In a phonograph having a turntable, electric drive means for driving said turntable including switch means having on and off switch positions, record support and release means operable to support a stack of records to be released sequentially to said turntable, a tone arm structure including a tone arm adapted to carry stylus means and rotatably supported disc-like change cycle cam means in combination: gear means operable to drive said cam disc means including a driving gear wheel operatively connected with said turntable and an idler gear wheel movable between an operative engaged driven position and an inoperative disengaged position, a pivotable gear actuator lever means operatively connecting said gear actuator lever with said idler gear wheel to move said idler gear wheel to said operative position in response to pivoting in an actuation direction, striker means operable in response to the termination of the playing of a record and operatively connected with said gear actuator lever to pivot the same in said actuating direction, a pivotable switch actuator lever operatively connected with said switch means and movable between an inoperative switch-off position and an operative switch-on position, a manually operable control member, means for mounting said control member for reciprocation, means operatively connecting said control member with said switch actuator lever to move said switch actuator lever from said switch-off position to said switch-on position through a first part of its stroke, and means operatively connecting said control member with said gear actuator lever to move said gear actuator lever in said actuating direction through a second part of its stroke, cycle responsive means operatively connecting said cam disc with said switch actuator lever to move the same to said switch-off position, and means operable to render said cycle-responsive means operable only in response to absence of records on said relatively stationary spindle.

8. In a phonograph having a turntable, electric drive means for driving said turnable including switch means, a relatively stationary record support means for supporting a stack of records above said turntable and including means to supply the records sequentially to said turntable, a tone arm structure including a tone arm adapted to carry stylus means, and a cycle control means including a cycle cam and engageable and disengageable cycle cam gear means, an actuator mechanism for said cycle control means comprising in combination: a reciprocable mounted manually operable actuator member, a member operable in response to termination of the playing of a record, a member operable in response to the absence of a record on said record support means, a single cycle cam gear actuator member operatively connected with said record termination responsive member as well as with said reciprocable member and operable to be actuated to alternatively engage said cycle cam gear upon operation of said record termination responsive means as well as upon manual operation of said reciprocable member, and a single switch control member operatively connected with said record absence responsive member as well as with said reciprocable member and operable to be alternatively operated to a switch-off position by each of said members as well as operable to be moved to a switch-on position upon operation of said reciprocable member.

9. In a phonograph having a turntable, electric drive means for driving said turntable including switch means, a relatively stationary record support means for supporting a stack of records above said turntable and including means to supply the records sequentially to said turntable, a tone arm structure including a tone arm adapted to carry stylus means, and a cycle control means including a cycle cam and engageable and disengageable cycle cam gear means, an actuator mechanism for said cycle control means comprising in combination: an elongated manually operable actuator member mounted for reciprocation, a trip starter means operable in response to termination of the playing of a record and including a lever mounted for reciprocation, a stop control means operable in response to the absence of a record on said record support means and including a member assuming an inoperative position when at least one record is supported on said stationary support and being moved to an operative position after supply of the last record to the turntable, a single pivotable cycle cam gear actuator lever operatively connected with said reciprocable trip starter lever as well as with said elongated actuator member and operable to be actuated to individually engage said cycle cam gear upon operation of said trip starter lever means as well as upon manual operation of said actuator member, and a single pivotable switch control member operatively connected with said stop control member as well as with said actuator member and operable to be alternatively pivoted to the switch-off position by each of said members as well as operable to be moved to a switch-on position upon operation of said actuator member.

10. In a phonograph having a turntable, electric drive means for driving said turntable including switch means having on and off switch positions, a relatively stationary spindle adapted to support a stack of records to be supplied sequentially to said turntable, a tone arm structure including a tone arm adapted to carry stylus means and rotatably supported disc-like change cycle cam means in combination: a manual control member having an on-position, an off-position and a reject-position, gear means operable to drive said cam disc including a driving gear wheel operatively connected with said turntable drive means to be driven therefrom and an idler gear wheel movable between an operative position in engagement with said driving gear wheel as well as with said cam disc and an inoperative position in engagement with said cam disc only, a pivotable gear actuator means, means supporting said gear actuator means for movement between an inoperative gear disengaging position and an operative gear engaging position, a pivotable switch actuator means, means supporting said switch actuator means for movement between an inoperative position effectively providing the off-position of said switch means and an operative position effectively providing the on-position of said switch means, means operatively connecting said manual control member with said switch actuator means as well as with said gear actuator means operable to effectively switch said switch actuator means from said off-position to said on-position in response to movement of said manual control member from said off-position to said on-position and to effectively engage said gear means by further movement of said manual control member to said reject-position through said on-position thereof, means operatively connecting said cam disc with said switch actuator means to effectively move said actuator means to said inoperative position, and means operable to render said last mentioned means operable only in response to absence of records on said relatively stationary spindle.

11. A phonograph of the type having a turntable, electric drive means for driving the turntable at a plurality of different speeds with speed selector means therefor and including switch means, a stationary support for a stack of records to be supplied sequentially to the turntable, a tone arm adapted to carry stylus means, and cycle control means including a cycle cam and engageable and disengageable cycle cam gear means, means operable to actuate said cycle means in response to termination of the playing of the record, and switch-off control means operable in response to the absence of a record on said support having an actuator mechanism comprising: a single cycle cam gear actuator member operatively connected with said record termination responsive means to provide engagemet of said cycle cam gear upon operation thereof, a single switch control member operatively connected with said record absence responsive means adapted to be operated to open the switch in response to the operation of said record absence responsive means, and a single manually operable actuator member operable to operate said gear actuator member to provide engagement of said gear independently of said record termination responsive means as well as operable to actuate said switch control member independently of said record absence responsive means to switch on and off said switch means, means operatively connected with said speed selector means operable to render said cam gear actuator member inoperative to engage said cam gear at a selected one of said turnable speeds and means operable to render said cam gear actuator member operable to actuate said switch control member to switch off said switch means only when rendered inoperative to engage said cam gear.

12. A phonograph of the type having a turntable, electric drive means for driving the turntable including switch means, a stationary support for a stack of records to be supplied sequentially to the turntable, a tone arm adapted to carry stylus means, and cycle control means including a cycle cam and engageable and disengageable cycle cam gear means, means operable to actuate said cycle means in response to termination of the playing of the record, and switch-off control means operable in response to the absence of a record on said support having an actuator mechanism comprising: a single elongated cycle cam gear actuator lever, means supporting said gear actuator lever for pivotable movement, means operatively connecting one end of said gear actuator lever with said record termination responsive means to pivot said gear actuator lever in response to the operation of said record termination responsive means, means on said gear actuato lever to provide engagement of said cycle cam gear upon pivoting thereof, a single switch control member adapted to be operable to open the switch in response to the operation of said record absence responsive means, and a single manually operable actuator member adapted to operate said gear actuator member to provide engagement of said cam gear independently of said record termination responsive means as well as operative to operate said switch control member independently of said record absence responsive means to switch on and off said switch.

13. A phonograph of the type having a turntable having a spindle, electric drive means for driving the turntable including switch means, a stationary support for a stack of records to be supplied sequentially to the turntable, a tone arm adapted to carry stylus means, and cycle control means including a cycle cam and engageable and disengageable cycle cam gear means including an idler gear wheel and a driving gear wheel on said turntable spindle and a peripheral recess of said cycle cam operable to receive a portion of said idler gear wheel to disengage the same from said driving gear wheel, means operable to actuate said cycle means in response to termination of the playing of the record, and switch-off control means operable in response to the absence of a record on said support having an actuator mechanism comprising: a single elongated cycle cam gear actuator lever, means supporting said gear actuator lever for pivotable movement, means operatively connecting one end of said gear actuator lever with said record termination responsive means to pivot said gear actuator lever in response to the operation of said record termination responsive means, means supporting said idler gear wheel for movement, detent spring means operable to maintain said idler gear wheel in said disengaged position, a cam means on said gear actuator lever operable to engage said idler gear wheel upon pivoting of said gear actuator lever to provide engagement thereof against the action of said detent spring means, a single switch control member adapted to be operable to open the switch in response to the operation of said record absence responsive means, and a single manually operable actuator member adapted to operate said gear actuator member to provide engagement of said cam gear independently of said record termination responsive means as well as operable to operate said switch control member independently of said record absence responsive means to switch on and off said switch.

14. A phonograph of the type having a turntable having a spindle, electric drive means for driving the turntable including switch means, a stationary support for a stack of records to be supplied sequentially to the turntable, a tone arm adapted to carry stylus means, and cycle control means including a cycle cam and engageable and disengageable cycle cam gear means including an idler gear wheel and a driving gear wheel on said turntable spindle and a peripheral recess of said cycle cam operable to receive a portion of said idler gear wheel to disengage the same from said driving gear wheel, means operable to actuate said cycle means in response to termination of the playing of a record, and switch-off control means operable in response to the absence of a record on said support having an actuator mechanism comprising: a single elongated cycle cam gear actuator lever, means supporting said gear actuator lever for pivotable movement, means operatively connecting one end of said gear actuator lever with said record termination responsive means to pivot said gear actuator lever in response to the operation of said record termination responsive means to pivot said gear actuator lever in response to the operation of said record termination responsive means, means supporting said idler gear wheel for movement, detent spring means operable to maintain said idler gear wheel in said disengaged position, a cam means on said gear actuator lever operable to engage said idler gear wheel upon pivoting of said gear actuator lever to provide engagement thereof against the action of said detent spring means, actuator spring means operatively connected with said cycle cam for initiating movement thereof upon engagement of said idler gear wheel, a single switch control member adapted to be operable to open the switch in response to the operation of said record absence responsive means, and a single manually operable actuator member adapted to operate said gear actuator member to provide engagement of said cam gear independently of said record termination responsive means as well as operable to operate said switch control member independently of said record absence responsive means to switch on and off said switch.

15. A phonograph as claimed in claim 14 having a reciprocable member operatively connected with said phonograph to perform a cycle responsive function, means operatively connecting said actuator spring means with said reciprocable member to bias said reciprocable member against said cycle cam, and means operatively connecting said reciprocable member with said cycle cam to effectively provide a torque thereon by means of said bias when said cycle gear is disengaged.

16. A phonograph of the type having a turntable having a spindle, electric drive means for driving the turntable including switch means, a stationary support for a stack of records to be supplied sequentially to the turntable, a tone arm adapted to carry stylus means, and cycle control means including a cycle cam and engageable and disengageable cycle cam gear means including an idler gear wheel and a driving gear wheel on said turntable spindle and a peripheral recess of said cycle cam operable to receive a portion of said idler gear wheel to disengage the same from said driving gear wheel, means operable to actuate said cycle means in response to termination of the playing of the record, and switch-off control means operable in response to the absence of a record on said support having an actuator mechanism comprising: a single elongated cycle cam gear actuator lever, means supporting said gear actuator lever for pivotable movement, means operatively connecting one end of said gear actuator lever with said record termination responsive means to pivot said gear actuator lever in response to the operation of said record termination responsive means, means supporting said idler gear wheel for movement, detent spring means operable to maintain said idler gear wheel in said disengaged position, a cam means on said gear actuator lever operable to engage said idler gear wheel upon pivoting of said gear actuator lever to provide engagement thereof against the action of said detent spring means, means operable to allow said gear actuator lever to yield relatively to its pivot, a single switch control member adapted to be operable to open the switch in response to the operation of said record absence responsive means, and a single manually operable actuator member adapted to operate said gear actuator member to provide engagement of said cam gear independently of said record termination responsive means as well as operable to operate said switch control member independently of said record absence responsive means to switch on and off said switch.

17. A phonograph of the type having a turntable, electric drive means for driving the turntable including switch means, a stationary support for a stack of records to be supplied sequentially to the turntable, a tone arm adapted to carry stylus means, and cycle control means including a cycle cam engageable and disengageable cycle cam gear means, means operable to actuate said cycle means in response to termination of the playing of a record, and switch-off control means operable in response to the absence of a record on said support having an actuator mechanism comprising: a single cycle cam gear actuator member operatively connected with said record termination responsive means to provide engagement of said cycle cam gear upon operation thereof, a single switch actuator lever, means for mounting said switch actuator lever for pivotable movement, snap action spring means operable to maintain said switch actuator lever in one of the exterior positions corresponding to a switch-on position and a switch-off position, respectively, means operatively connecting said switch actuator lever with said record absence responsive means to pivot said switch actuator lever to said switch-off position in response to the operation of said record absence responsive means, and a single manually operable actuator member mounted for reciprocation and operable to operate said gear actuator member to cause engagement of said gear independently of said record termination responsive means in response to reciprocation through a first part of its stroke, means operatively connecting said actuator member with said switch actuator lever to pivot said switch actuator lever independently of said record absence responsive means between said switch-on and said switch-off positions in response to reciprocation through a second part of its stroke, and means operable to enable disengagement of said reciprocable actuator member from said switch actuator lever in said switch-on position thereof.

18. A phonograph as claimed in claim 17, in which said gear actuator member is in the form of a lever which is mounted for pivotable movement and is able to yield relatively to its pivot and operatively connected with said record termination responsive means adjacent one end to be pivoted in a predetermined direction upon actuation of said record termination responsive means as well as positioned to be engaged by said reciprocable actuator member in response to its reciprocation through its second part of its stroke when disengaged from said switch actuator lever.

19. A phonograph of the type having a turntable, electric drive means for driving the turntable at a plurality of different speeds with speed selector means therefor and including switch means, a stationary support for a stack of records to be supplied sequentially to the turntable, a tone arm adapted to carry stylus means, and cycle control means includng a cycle cam and engageable and disengageable cycle cam gear means, trip starter means including striker means operable to actuate said cycle means in response to termination of the playing of a record, and switch-off control means operable in response to the absence of a record on said support having an actuator mechanism comprising: a single pivotable cam gear actuator lever operatively connected with said trip starter striker means to pivot said gear actuator lever and thereby effectively provide engagement of said cycle cam gear upon operation thereof, a single switch actuator lever, means for mounting said switch actuator lever for pivotable movement, means operable to pivot said switch actuator lever between an exterior position corresponding to a switch-on position and an exterior position corresponding to a switch-off position, means operatively connecting said switch actuator lever with said record absence responsive means to pivot said switch actuator lever to said switch-off position in response to the operation of said record absence responsive means, a single manually operable actuator member mounted for reciprocation and operable to operate said gear actuator lever to pivot the same to engage said cycle cam gear independently of said trip starter striker means in response to reciprocation through a first part of its stroke, means operatively connecting said actuator member with said switch actuator lever to pivot said switch actuator lever independenly of said record absence responsive means between both said switch-on and said switch-off positions in response to reciprocation through a second part of its stroke, means operable to enable disengagement of said reciprocable actuator member from said switch actuator lever in said switch-on position thereof, and means operable in response to a selected one of said turntable speeds to prevent the pivoting of said gear actuator lever about its pivot to render said cycle gear engagement ineffective.

20. In a phonograph of the type having a turntable, electric drive means for driving the turntable including switch means, a stationary support for a stack of records to be supplied sequentially to the turntable, a tone arm adapted to carry stylus means, and cycle control means including a cycle cam gear means including an idler gear wheel being movable to be disengaged under influence of a detent spring means and to be engaged against the action thereof, means operable to actuate said cycle control means in response to the termination of the playing of the record, and switch-off control means operable in response to the absence of a record on said support, an actuator mechanism comprising: a single cycle cam gear actuator lever, means supporting said gear actuator lever for pivotable movement, means operatively connecting one end of said gear actuator lever with said record termination responsive means to pivot said gear actuator lever against the action of said detent spring means in response to the operation of said record termination responsive means, means on said gear actuator lever to move said idler gear wheel to provide engagement of said cycle cam gear in response to said pivoting thereof, means supporting said gear actuator lever to effectively yield relatively to its pivot, a single switch control member adapted to be operable to open the switch in response to the operation of said record absence responsive means, and a single reciprocable manually operable actuator member adapted to pivot said gear actuator lever to move said idler gear wheel to engage said cam gear independently of said record termination responsive means as well as operable to operate said switch control member independently of said record absence responsive means to switch on and off said switch means.

21. A phonograph of the type having a turntable, electric drive means for driving the turntable at a plurality of different speeds including switch means and spaced selector means, a stationary support for a stack of records to be supplied sequentially to the turntable, a tone arm adapted to carry stylus means, and cycle control means including a cycle cam gear means including an idler gear wheel being movable to disengage under influence of a detent spring means and engage said gear means against the action thereof, cycle cam gear means, means operable to actuate said cycle means in response to the termination of the playing of the record, and switch-off control means operable in response to the absence of a record on said support having an actuator mechanism comprising: a single cycle cam gear actuator lever, means supporting said gear actuator lever for pivotable movement, means operatively connecting one end of said gear actuator lever with said record termination responsive means to pivot said gear actuator lever against the action of said detent spring means in response to the operation of said record termination responsive means, means on said gear actuator lever to move said idler gear wheel to provide engagement of said cycle cam gear in response to said pivoting thereof, means operatively connected with said speed selector means operable in response to a predetermined of said speeds to prevent the pivoting of said gear actuator lever to cause said cycle cam gear engagement, means supporting said gear actuator lever to effectively yield relatively to its pivot in response to the operation of said speed responsive means, a single switch control member operable to open the switch in response to the operation of said record absence responsive means, means operatively connecting said switch control member with said gear actuator lever to operate said switch actuator lever to open said switch in response to yielding of said gear actuator lever, and a single reciprocable manually operable actuator member adapted to pivot said gear actuator lever to move said idler gear wheel to engage said cam gear independently of said record termination responsive means as well as operable to operate said switch control member independently of said record absence responsive means to switch on and off said switch means.

22. A phonograph as claimed in claim 21, in which the means supporting said gear actuator lever to yield relatively to its pvot is in the form of a slot connection operable to enable said gear actuator lever to pivot about one end thereof, and in which said speed selector responsive means is in the form of an abutment movable between an inoperative position and an operative position in which it effectively provides an auxiliary pivot for said actuator lever adjacent said end thereof and in which further said switch control member is provided with an abutment operable to be engaged by said gear actuator lever when the latter is pivoted about said end to thereby move said switch control member to open said switch.

References Cited by the Examiner

UNITED STATES PATENTS 3,017,188 1/62 Hansen ---------------- 274—10

NORTON ANSHER, *Primary Examiner.*